(12) United States Patent
Kamrava

(10) Patent No.: US 12,539,113 B2
(45) Date of Patent: Feb. 3, 2026

(54) SURGICAL INSTRUMENT FOR MANIPULATING AND PASSING SUTURE

(71) Applicants: Smith & Nephew, Inc., Memphis, TN (US); Smith & Nephew Orthopaedics AG, Zug (CH); Smith & Nephew Asia Pacific Pte. Limited, Singapore (SG)

(72) Inventor: Soroush Kamrava, Quincy, MA (US)

(73) Assignees: Smith & Nephew, Inc., Memphis, TN (US); Smith & Nephew Orthopaedics AG, Zug (CH); Smith & Nephew Asia Pacific Pte. Limited, Singapore (SG)

( * ) Notice: Subject to any disclaimer, the term of this patent is extended or adjusted under 35 U.S.C. 154(b) by 375 days.

(21) Appl. No.: 17/790,580

(22) PCT Filed: Jan. 13, 2021

(86) PCT No.: PCT/US2021/013258
§ 371 (c)(1),
(2) Date: Jul. 1, 2022

(87) PCT Pub. No.: WO2021/146297
PCT Pub. Date: Jul. 22, 2021

(65) Prior Publication Data
US 2023/0045276 A1 Feb. 9, 2023

Related U.S. Application Data

(60) Provisional application No. 62/960,477, filed on Jan. 13, 2020.

(51) Int. Cl.
*A61B 17/04* (2006.01)
*A61B 17/06* (2006.01)

(52) U.S. Cl.
CPC .............. *A61B 17/0469* (2013.01); *A61B 2017/06009* (2013.01); *A61B 2017/0608* (2013.01)

(58) Field of Classification Search
CPC ............ A61B 17/0469; A61B 17/0485; A61B 2017/00367; A61B 2017/00862;
(Continued)

(56) References Cited

U.S. PATENT DOCUMENTS 5,312,423 A 5/1994 Rosenbluth et al.
5,499,991 A 3/1996 Garman et al.
(Continued)

FOREIGN PATENT DOCUMENTS

CN 101084832 A 12/2007
CN 102448383 A 5/2012
(Continued)

*Primary Examiner* — Dianne Dornbusch
(74) *Attorney, Agent, or Firm* — Norman F. Hainer, Jr.; Kate Ryland Tetzlaff

(57) ABSTRACT

A suture passing instrument for manipulating and passing suture through a tissue is disclosed. 5 The instrument includes a handle, an elongate shaft extending from the handle, a hook movably disposed within the elongate shaft. The elongate shaft includes a distal portion having an open end. The hook is movable from a retracted configuration in which at least a portion the hook is situated within the elongate shaft, and a deployed configuration in which the hook extends distally from the open end. The hook is operatively coupled to an actuator of the handle via a 10 coupling member and the hook is moved from the retracted configuration to the deployed configuration be applying tension to the coupling member.

17 Claims, 5 Drawing Sheets

(58) Field of Classification Search
CPC .... A61B 2017/00946; A61B 2017/047; A61B 2017/06009; A61B 2017/0608; A61B 2017/061; A61B 17/06109; A61B 2017/00477; A61B 17/0482; A61B 17/0491

See application file for complete search history.

(56) References Cited

U.S. PATENT DOCUMENTS

| | | | |
|---|---|---|---|
| 5,910,148 A | 6/1999 | Reimels et al. | |
| 6,022,360 A * | 2/2000 | Reimels | A61B 17/06109 606/139 |
| 10,405,850 B2 * | 9/2019 | Stewart | A61B 17/0469 |
| 2003/0181924 A1 | 9/2003 | Yamamoto et al. | |
| 2005/0021052 A1 | 1/2005 | Kim | |
| 2006/0069396 A1 * | 3/2006 | Meade | A61B 17/0482 606/144 |
| 2006/0292917 A1 | 12/2006 | Miyamoto et al. | |
| 2009/0018554 A1 | 1/2009 | Thorne et al. | |
| 2013/0165954 A1 | 6/2013 | Dreyfuss et al. | |
| 2013/0218173 A1 * | 8/2013 | Weisel | A61B 17/0483 606/144 |
| 2015/0374359 A1 | 12/2015 | Heneveld | |
| 2016/0038141 A1 | 2/2016 | LeVine et al. | |
| 2017/0042533 A1 * | 2/2017 | Lunn | A61B 17/06109 |
| 2018/0116652 A1 | 5/2018 | Torrie | |

FOREIGN PATENT DOCUMENTS

| | | |
|---|---|---|
| CN | 105163674 A | 12/2015 |
| EP | 2286730 A2 | 2/2011 |
| IN | 107582117 A | 1/2018 |
| WO | 2015099977 A1 | 7/2015 |
| WO | 2016051821 A1 | 4/2016 |

* cited by examiner

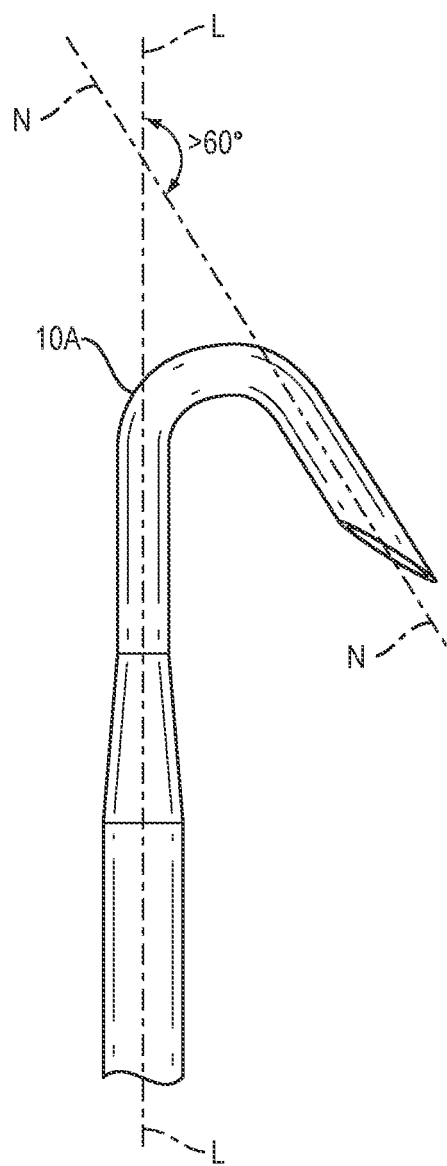
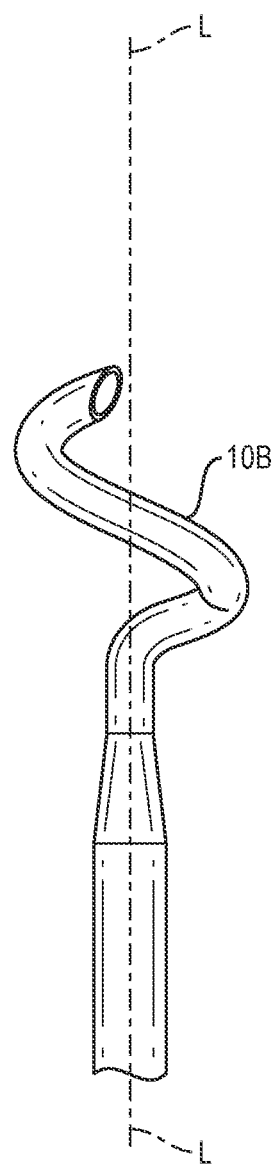
FIG. 1A
FIG. 1B

SURGICAL INSTRUMENT FOR MANIPULATING AND PASSING SUTURE

CROSS-REFERENCE TO RELATED APPLICATIONS

This application is the U.S. national phase entry under 35 U.S.C. § 371 of International Application No. PCT/US2021/013258, filed Jan. 13, 2020, entitled "SURGICAL INSTRUMENT FOR MANIPULATING AND PASSING SUTURE," which claims priority to and benefit of U.S. Provisional Application No. 62/960,477, filed Jan. 13, 2020, the contents of which are incorporated herein by reference in their entirety for all purposes.

FIELD OF THE INVENTION

The present invention relates to a surgical instrument that can manipulate and pass suture through tissue.

BACKGROUND

Endoscopic or arthroscopic surgery involves the performance of surgical procedures through small openings and under visualization using an endoscope. Access to a target tissue is normally provided through one or more portals formed directly in the patient's body or through one or more cannulas inserted into the patient's body through small incisions. A desired surgical procedure is carried out by a surgeon with elongated instruments inserted through these cannulas.

Suture may be passed through tissue during an endoscopic procedure. This could be required to mend a tear in the tissue or to connect two or more pieces of the soft tissue to one another. Passing and retrieving suture through tissue can be challenging in an endoscopic or arthroscopic procedure where visualization and space is limited.

Various endoscopic instruments have been developed to pass and retrieve suture through tissue. In some instances, retrieval of suture is accomplished by simply grasping it with regular forceps. Some suture retrievers include simple loops which extend from the tip of an elongated tube and which can be closed upon a suture passed through the loop.

Direct passer style devices have become popular, such as the Smith and Nephew ACCU-PASS™, sold by Smith and Nephew Inc.; and disclosed in at least U.S. Pat. No. 10,265,062, commonly owned and herein incorporated in its entirety by reference. Direct passer style devices may be used to both retrieve and capture suture, without the use of a shuttling suture/wire. A shaped wire, oftentimes in a shape of a hook may be selectively actuated by pushing the hook along and out of a hollow needle end. The limitation of these devices is the balance between actuating the retrieving hook and the complexity of the needle bend. Device hooks are preferably manipulated close enough to the suture or target tissue location. In an endoscopic procedure, where portal locations are limited, positioning the hook in such close proximity to the suture or target location may preferably require a hook to have an angular offset from the proximal end of the device. However, angular offsets that include complex bends, such as sharper bends that better target tissue locations tend to frustrate hook actuation. The push mechanisms may not easily translate along a complex needle curve and applying higher loads may cause buckling of the wire.

Accordingly, there is a need for a suturing instrument for manipulating suture through tissue with a more complex needle bend, overcoming the above described shortcomings.

BRIEF DESCRIPTION OF THE DRAWINGS

For a detailed description of example embodiments, reference will now be made to the accompanying drawings in which:

FIGS. 1A and 1B show example ends of a needle with tight or complex bends;

SUMMARY

Figure 2:
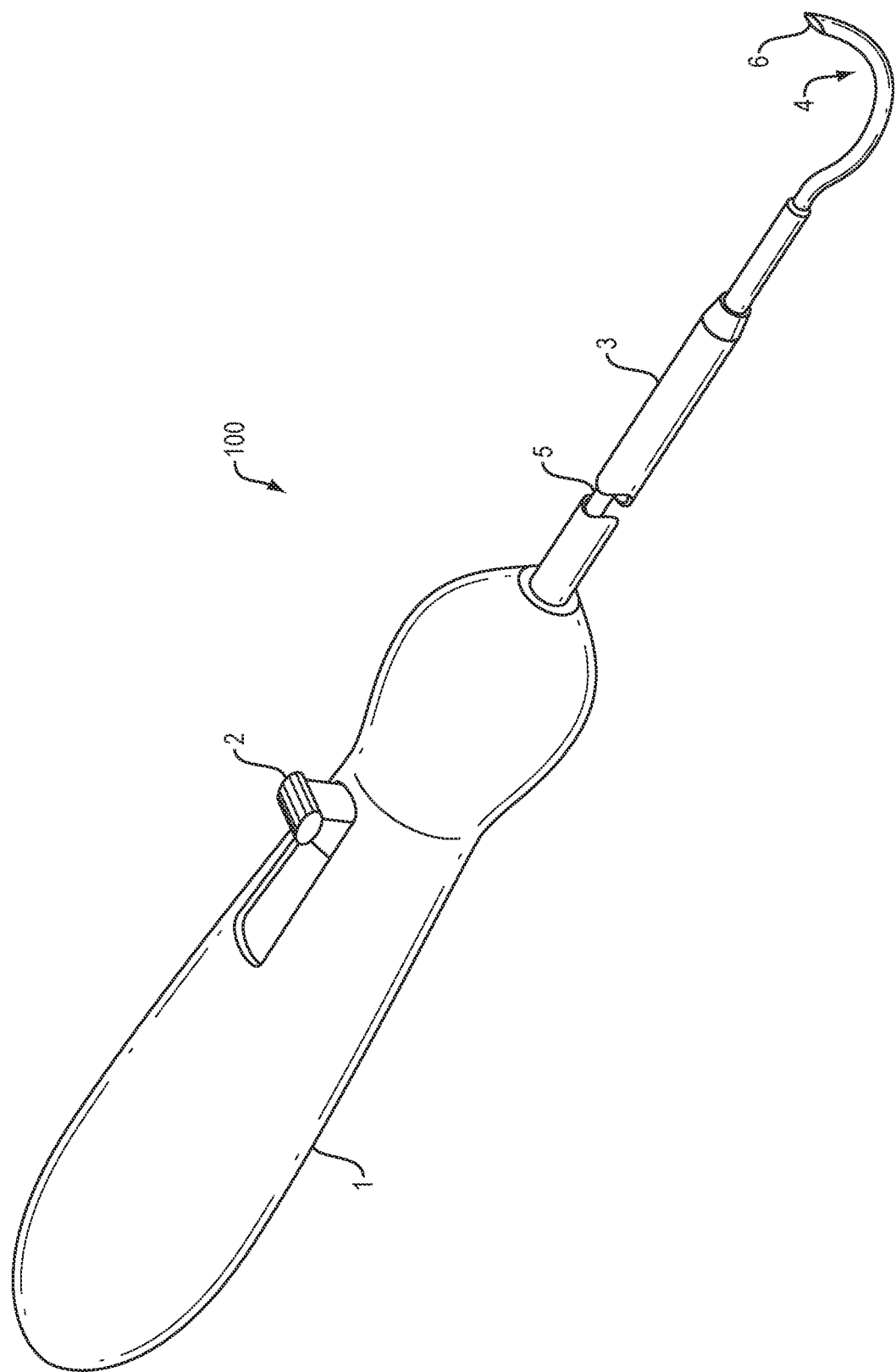
FIG. 2 illustrates an example suture passer in accordance with at least some embodiments.

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

Generally disclosed is a device for selectively capturing and releasing a surgical element such as a suture. The device includes a needle end for gaining access to a target location, the needle preferably including a tissue-piercing tip. The needle is hollow and houses capturing member within the needle. Once in the desired location, the capturing member may slide and emerge from the needle end and capture the surgical element. Capturing member is shown as a hook through the disclosure, however other embodiments may include a shaped wire, or a plurality of curved wires or hooks that are generally configured to emerge from the needle end and catch or wrap around a surgical element to move this element to a different location. This different location may include through a thickness of tissue.

In some embodiments, the needle may have at least one bend therealong to improve access to target locations. In some embodiments the at least one bend may include a complex curve defined as having at least one bend that is at least 60 degrees along at least one plane. Stated alternatively, the needle may include at least one bend that angularly offsets a longitudinal axis of the distal-most end of the needle relative to a longitudinal axis of a proximal portion of the needle, the angular offset being at least 60 degrees extending through the distal end of the device. In some examples, a complex curve may include at least two serial curves, such as an S curve. In other examples, a complex curve may define a curve in three-dimensional space for example a helical curve. Example needle curves 10A and 10B are shown in FIGS. 1A and 1B respectively. FIG. 1A shows a single curve that is greater than 60 degrees. More specifically, FIG. 1A shows a single curve that is over 90 degrees, and is approximately 120 degrees. FIG. 1B shows a helical curve 10B. In needles that extend along complex curves as described herein, deploying the slideable capture member using a push rod may be frustrated. Push rods that are rigid enough to transfer a pushing (compression load) may not lend themselves to readily curving around complex geometry curves or tight bends. This disclosure includes a flexible construct formed of flexible cable, wire, rope or suture for example, that may extend around and slide along the complex geometry of the needle. In some embodiments, the needle may be provided with a first bend, or in a straight configuration, and may be malleable so that the user may selectively adjust the needle bend. The flexible construct described herein is configured to adapt to a range of bends that may be adjustable due to a malleable instrument or instrument shaft; malleable being defined as a plastically deformable portion of the shaft such that upon bending the shaft, the shaft remains in the bent shape, upon release from applied force from the user. In other embodiments, the needle may include a flexible portion that may controllably articulate to selectively articulate to a bent configuration. Example flexible portions may include a tubular spring or a series of axially spaced slots defining a spine for example.

A handle end of the device may be operatively coupled to the flexible construct to apply tension and move the flexible construct in a desired direction. One side of the flexible construct may be under tension to deploy the capture member, and the other side of the flexible construct may be placed under tension to retract the capture member.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various embodiments are directed to a suture-passing instrument for manipulating and passing suture through a tissue. The instrument includes a handle and an elongate shaft extending from the handle. The shaft has a distal portion with an opening. The instrument also includes a hook movable from a retracted configuration in which at least a portion of the hook is situated within the shaft, and a deployed configuration in which the hook extends out of the shaft and through the opening. The instrument also includes a coupling member operably coupled to both the hook and an actuator of the handle. Tension on the coupling member moves the hook from the retracted configuration to the deployed configuration.

In some example embodiments, the shaft distal portion may define a needle with a tissue penetrating distal tip. The coupling member may be slideably situated within the elongate shaft distal portion and have a distal-most end disposed within the shaft distal portion. The coupling member may define a flexible loop construct. The flexible loop construct may loop around a rod that extends across and within the shaft distal portion. Tension on a first side of the flexible loop construct is configured to deploy the hook and tension on a second side of the flexible loop is configured to retract the hook. The elongate shaft distal portion defines an axis that may define a complex curve, and the coupling member may extend along the complex curve. The coupling member may extend along the entire complex curve in both a deployed and retracted configuration. The coupling member may be coupled to the handle via a biasing member configured to maintain a minimum tension on the coupling member.

An example method of manipulating a suture is disclosed including the steps of placing an open end of an elongate shaft of a suture passer adjacent a target suture. Tension is applied to a coupling member disposed along the elongate shaft to deploy an inner member from the open end. The suture is engaged by the inner member. In some example methods, the elongate shaft defines an axis having a complex curve configured to place the inner member adjacent the target suture at a location angularly offset from a proximal end longitudinal axis of the elongate shaft. In some example methods, the coupling member extends around the complex curve, and the inner member is coupled to the coupling member distal to the complex curve. The coupling member may be a flexible member loop, having a first side and a second side of the loop. Applying tension to the coupling member to deploy the inner member may comprise applying tension to the first side. Applying tension to the second side may retract the inner member into the shaft. The method may also include piercing tissue with a sharp distal tip of the elongate shaft. The method may also include adjusting an angular offset between the open end and a proximal end axis of the instrument before engaging the suture with the inner member. The elongate shaft may be deformable to alter the angular offset.

A further example embodiment of a suture passer is disclosed, the suture passer including a handle having an actuator and an elongated shaft extending distally from the handle. The elongate shaft includes a distal end having an opening. The suture passer also includes a capturing member slideably disposed along the shaft and extendable through the opening. The suture passer also includes a coupling member slidably situated within the shaft and operatively coupled to both the capturing member and the actuator. The coupling member moves the capturing member between a retracted position in which the capturing member is housed within the shaft and an extended position in which the capturing member is extended from the opening. A side of the coupling member slides proximally while moving the capturing member to the extended position.

In some example embodiments, the distal end defines an axis that has a complex curve along the shaft distal end and wherein the coupling member extends around the complex curve. The coupling member may define a flexible loop construct extending along the shaft, the flexible loop distal-most end proximally spaced from the shaft opening. The coupling member may loop around a first and second rod, the first rod proximally and fixedly spaced from the opening and the second rod fixedly disposed adjacent the actuator. Tension on another side of the coupling member may retract the capturing member.

DETAILED DESCRIPTION

Various embodiments are directed to a device and methods of translating a hook along a complex curve of a suture passer. The specification now turns to an example system.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

A surgical instrument 100 for manipulating and passing suture is shown in FIG. 2. The instrument 100 comprises a handle 1, a lever, slide, or button 2, an elongate shaft 3, and a working end 4. Working end 4 may define a tissue piercing distal-most end that is hollow and houses a hook or capturing member therein. Slide 2 controls the position of the hook relative to the working end 4, as will described herein. Working end 4 may include at least one tight bend (greater than 60 degrees) or a complex curve as defined herein. Working end 4 may be capable of bending, via input from the user, to form a complex curve. A flexible construct 5 may be disposed within the working end 4 and along the elongate shaft. Flexible construct 5 may selectively deploy a capturing member (hook) from opening 6. The instrument 100 may be used to pass and/or retrieve suture through tissue in a wide variety of applications including, for example, labrum or rotator cuff repair.

Figure 3A:
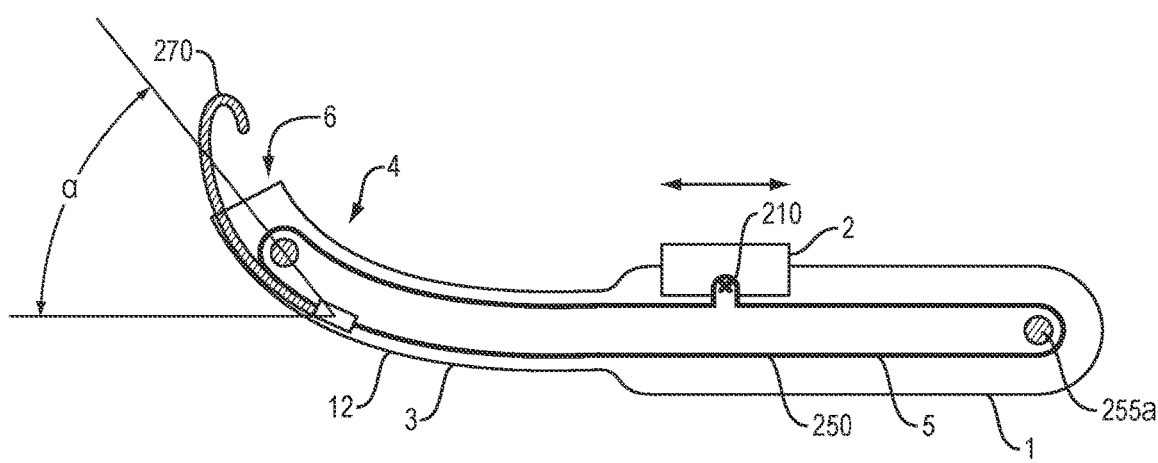
FIGS. 3A and 3B illustrates a flexible loop construct for actuating a suture capture member of a suture passer in accordance with at least some embodiments.
Figure 3B:
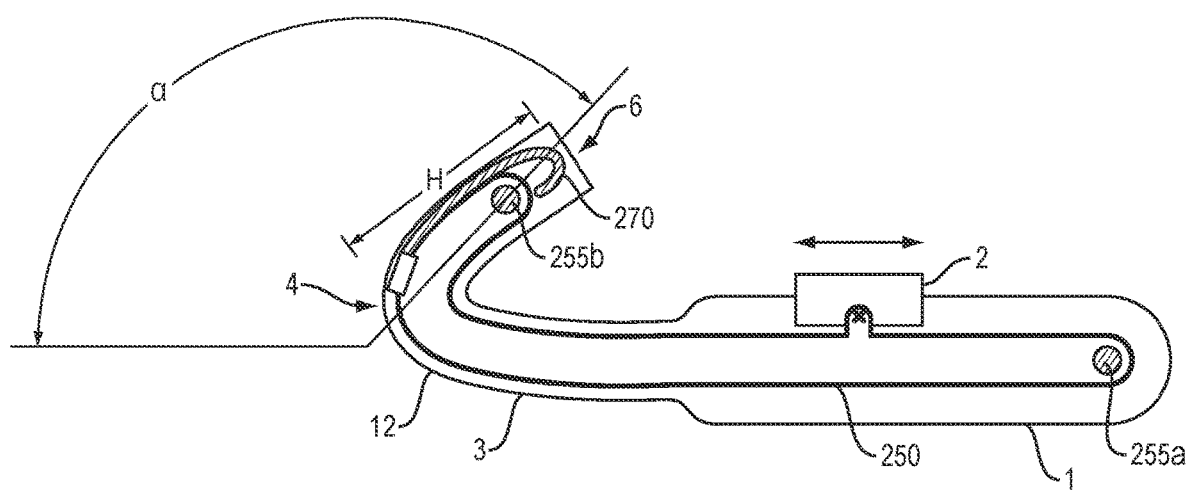

FIGS. 3A and 3B illustrates a flexible construct 5 for deploying a capture member from a needle lumen, the needle having complex curved as defined herein. The construct 5 relies upon a flexible member 250 that may be rope, cable, wire or suture for example that may be in a continuous loop. A flexible construct 5 readily extends and moves along complex curves. The construct 5 advances and retracts the capturing member 270 by applying tension on the flexible construct 5, therefore avoiding the frustrations associated with pushing an actuation member around complex curve. Slide or button 2 may be operatively coupled to flexible member 250 at point 210. Slide or button 2 may be a wheel, slide or any other means of applying tension to flexible member 250. Slide or button 2 may slide in a first direction to advance the capture member 270, and in an opposing direction to retract the capture member. For example, slide 2 may move along a device longitudinal axis in a proximal direction to advance the capture member 270. Slide 2 may be moved along the device longitudinal axis in a distal direction to retract the capture member 270. Alternatively, slide 2 may be operatively coupled to a biasing member (not shown), such that release of the slide 2 may automatically move the slide 2 to retract the capture member 270. Construct 5 may also include two pulley rods 255a and 255b and flexible member 250 may form a continuous loop around the two rods 255a and 255b. Flexible member 250 may move around the two rods 255a and 255b. Proximal rod 255a may be disposed within the handle 1. Distal rod 255b may be disposed along working end 4 and may be adjacent opening 6. Distal rod 255b may extend across an inner diameter of working end 4. Capturing member 270 is operatively coupled to flexible member 250 at working end 4. Capturing member may be separately formed from flexible member 250 and coupled to flexible member 250 via coupling means such as cinching, adhesives or welding for example. Capturing member 270 may preferably be more rigid than flexible member 250. For example, capturing member may be a biocompatible metal such as stainless steel. Flexible loop member 250 may form a loop and extend around the proximal and distal rod 255a and 255b and form a pulley construct. Pushing or pulling the actuator 2 may slide the flexible member 250 along the shaft 3 and working end 4 which translates the capturing member 270 in and out of the opening 6. Shown here are two rods 255a and 255b.

Depending on the curve geometry, there may be a need for further rods along the curves.

Capturing member 270 may be in the form of a hook to retrieve, manipulate and release a length of suture during surgery. Capturing member 270 is preferably rigid to better aim the capturing member 270 and resist deformation while pulling and manipulating the captured suture. Therefore, the entire length of capturing member 270 may be configured to be housed entirely within the needle end in an unstressed or low stressed configuration. In a retracted configuration, the entire length of capturing member 270 may be disposed within and along the working end, between the opening 6 and a distal-most bend 12 along the working end. This allows the capturing member 270 to have substantial rigidity to deformation, while the flexible construct 5 provides a mechanism that translates the device operation (deployment and retraction) along complex curves. The concept of this mechanism is shown on a working end 4 with a single bend in FIGS. 3A, with an angle α through the distal end, of about 60 angular degrees, but the same mechanism may be used for more extreme complex working end curves such as the examples shown in FIGS. 3B, 1A and 1B. FIG. 3B shows an example embodiment with a tighter curve 12 than in FIG. 3A with the capturing member 270 having a length H, the capturing member 270 in a retracted configuration, and therefore disposed between open end 6 and distal-most bend 12. In some embodiments, the shaft 3 may be malleable or alternatively steerable, such that bend 12 may be changeable.

It is preferable that flexible construct 5 extend along the complex curve of the working end 4 while the more rigid suture capture member 270 remain relatively neutral (non-stressed or flexed). Therefore, the flexible construct 5 extends along a substantial portion of the working end complex curves. Flexible construct 5 distal-most end is defined by rod 255b, and therefore rod 255b is preferably disposed adjacent opening 6. Rod 255b may be preferably disposed at distal-most bend 12 and may more preferably be disposed along the working end 4 on an opposite side of distal-most bend 12 than handle 1. As such flexible construct 5 as a whole remains axially stationary relative to the shaft axis, in that the rods 255a and 255b may not move, as the capture member 270 moves in and out of the needle end. While the flexible member 250 may axially slide along the shaft, their position is limited to within the shaft by the positon of the rods 255. Stated alternatively, the flexible construct 5 does not move in and out of the needle end while the suture capture member 270 deploys and retracts.

Figure 4:
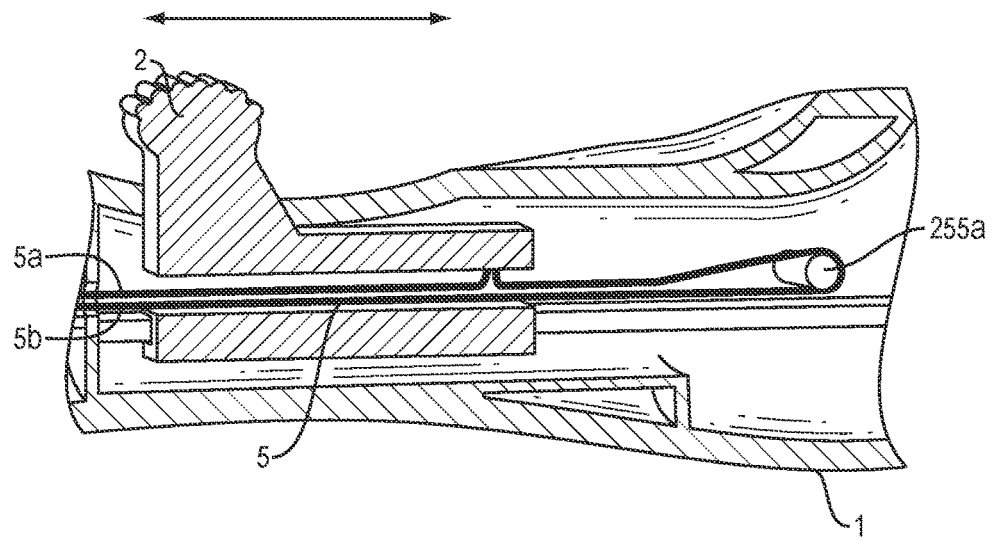
FIG. 4 illustrates a cross section of a suture passer handle with a closed loop pulley construct in accordance with at least some embodiments.
Figure 5A:
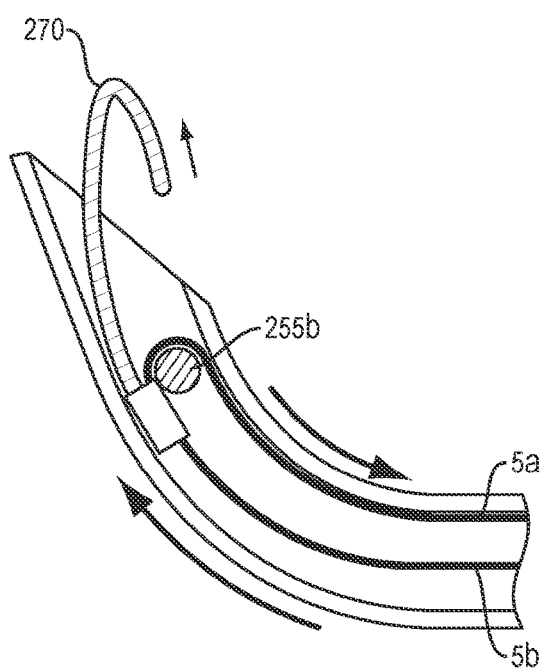
FIGS. 5A and 5B illustrate a method of deploying and retracting a suture capture member of a suture passer in accordance with at least some embodiments.
Figure 5B:
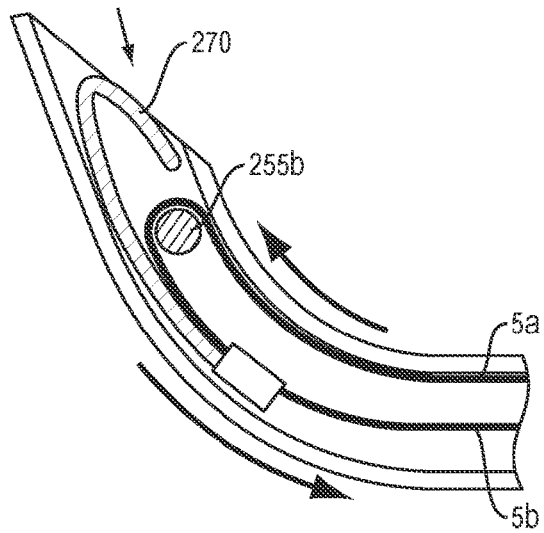

FIG. 4, with reference to FIGS. 5A and 5B, shows a cross section of handle 1. Sliding actuator 2 is shown operatively coupled to flexible construct 5. Flexible construct 5 includes a first or retracting side 5a and a second or deploying side 5b. A method of capturing a suture using a suture passer 100 is illustrated in FIGS. 5A and 5B. In order to deploy (advance) the capturing member 270, from a retracted configuration button or slide 2 may be pulled proximally. This applies tension to the first side 5a and slides suture capturing member 270 out of the opening 6 of working end 4. Depending on the geometry of the curve on the working end 4, capturing member 270 may be extended distally. With complex curves as shown for example in FIG. 3B, capture member 270 may extend at an angle defined by the curves 12 along needle. For example if the complex curve orients the distal-most end of working end 4 at 120 angular degrees through the distal end relative to a longitudinal axis of the proximal end of shaft 3, as illustrated in FIG. 3B, the suture capture member 270 may extend along an angle approximately the same. Continuing with this example, this may therefore extend the capture member 270 in a direction defined by the complex curve that may be towards the handle and therefore in a proximal direction.

In order to retract the capturing member 270 from a deployed configuration, button or slide 2 may be pushed distally to apply tension to the second side Sb and retract capturing member 270 into the working end. Depending on the geometry of the curve on the working end 4, capturing member 270 may be drawn proximally. In the geometry shown in FIG. 1A however, the suture capturing member 270 may be drawn into the working end 4 in general distal direction. In alternative embodiments, the button or slide 2 may be coupled to the other side of the loop and therefore pushing the slide 2 distally may apply tension to the first side 5*a*.

Figure 6A:
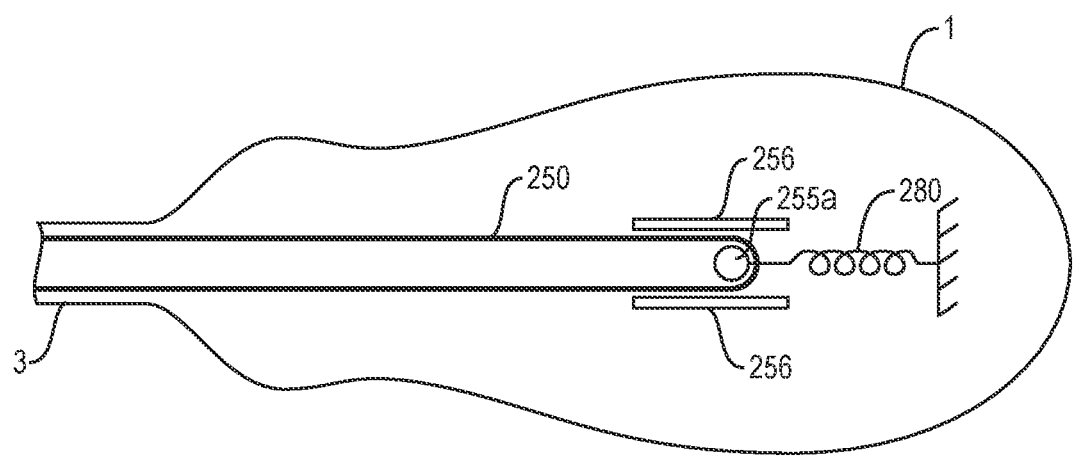
FIGS. 6A and 6B illustrate embodiments with tension biasing means operatively coupled to the flexible loop construct in accordance with at least some embodiments.
Figure 6B:
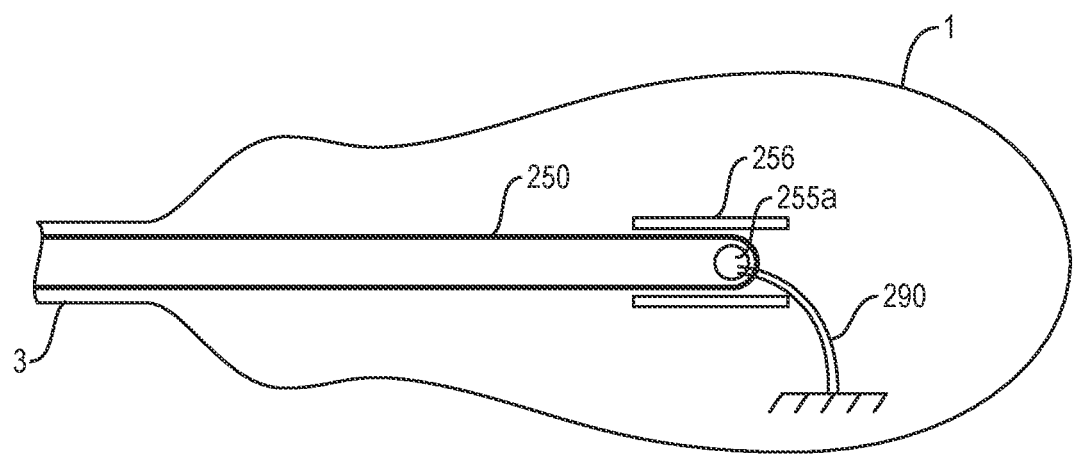

FIG. 6A shows an additional tensioning spring 280 coupled between handle 2 and rod 255*a*. In some embodiments, rod 255*a* may therefore not be fixedly attached to the handle 2, but rather attached via spring 280 and therefore moveable to a limited extent. Rod 255*a* may be constrained to move in a single direction only. For example, rod 255*a* may be constrained to axial movement only, using a slot or surfaces 256 associated with the handle 2, such that the rod 255*a* may translate along a single (axial) direction only. Spring 280 may be configured to compensate for any tension shifts on the flexible construct 5 during manipulation of the device 100. For example in some embodiments shaft 3 may be malleable and may be selectively bent by the surgeon to a targeted orientation. Tension on the flexible construct 5 may alter during bending. In some embodiments, shaft 3 may flex during manipulation of the tissue and therefore alter the tension on the flexible construct 5. In addition, over time, the tension on the flexible construct 5 may relax over time while in packaging, or during use. An alternative means of compensating for any shifts in tension on the flexible construct 5 may include a cantilever 290. Cantilever 290 may be coupled between handle 2 and rod 255*a*. Similar to the embodiment with spring 280, rod 255*a* may therefore not be directly attached to the handle 2, but attached via cantilever 290. Rod 255*a* may be constrained to axial movement only, using a slot or surfaces 256 associated with the handle 2, such that the rod 255*a* may translate along a single (axial) direction only. Cantilever 290 may be configured to compensate for any tension shifts on the flexible construct 250 during manipulation of the device 100, similar to those described with the spring 280. Cantilever 290 or spring 280 may provide a means to maintain a desired distance between the two rods (255*a* and 255*b*), the distance configured to maintain a minimum tension on the flexible construct. Without maintaining a minimum tension on the flexible construct, axial translation of a first or second side of the flexible construct may not directly translate capture member location.

A method of capturing a surgical element such as a suture is also disclosed herein, including placing an open needle end 6 of an elongate shaft of a suture passer 100 adjacent a target location and then applying tension to a flexible construct 5 disposed along the elongate shaft so as to deploy a capture member 270 from open end 6. Tension to a first side of the flexible construct may withdraw the first side of the flexible construct 5 and deploy the capture member 270. Element may then be captured by the capture member 270. Capturing may include applying tension to a second side of the flexible construct 5 (different to the first side) and may withdraw the second side of the flexible construct 5 and retract the capture member 270 with the captured element therein. The method may further comprise deforming the elongate shaft to form a bend along the elongate shaft. The method may further comprise articulating the elongate shaft to place the open end 6 closer to the target tissue. The flexible construct 5 may be operatively coupled to a handle actuator of the suture passer and applying tension on the flexible construct may comprise actuating the actuator. The method may further comprise piercing tissue with a sharp distal tip of the elongate shaft. The flexible construct 5 may define a closed loop construct extending along the elongate shaft and operatively coupled to the actuator and the method may further comprise applying tension on a first side of the closed loop construct to retract the first side and deploy the capture member and applying tension to a second side of the closed loop to retract the second side and thereby retract the capture member into the open end.

Although only a few embodiments of the present invention have been described, it should be understood that the present invention may be embodied in many other specific forms without departing from the spirit or the scope of the present invention. Therefore, the present examples are to be considered as illustrative and not restrictive, and the invention is not to be limited to the details given herein, but may be modified within the scope of the appended claims.

The invention claimed is:

1. A suture passing instrument comprising:
   a handle at a proximal end of the suture passing instrument, the handle having an actuator;
   a tubular shaft extending from the handle, the tubular shaft defining a longitudinal axis and comprising a distal portion having an opening;
   a hook movable along the tubular shaft longitudinal axis from a retracted configuration in which at least a portion of the hook is situated within the tubular shaft, and a deployed configuration in which the hook extends through the opening and external to the tubular shaft; and
   a coupling member operably coupled to both the hook and the actuator, the coupling member disposed within the tubular shaft and configured such that tension in a proximal direction on the coupling member moves the hook from the retracted configuration to the deployed configuration.

2. The suture passing instrument of claim 1 wherein the shaft distal portion includes a sharp distal tip.

3. The suture passing instrument of claim 1 wherein the coupling member is a loop construct, a distal-most end of the loop construct disposed at a fixed location within the tubular shaft.

4. The suture passing instrument of claim 1 wherein the coupling member defines a flexible loop construct.

5. The suture passing instrument of claim 4, wherein the flexible loop construct loops around a rod, the rod extending across the tubular shaft distal portion.

6. The suture passing instrument of claim 5 wherein tension in the proximal direction on a first side of the flexible loop construct moves the hook to the deployed configuration and tension in the proximal direction on a second side of the flexible loop moves the hook to the retracted configuration.

7. The suture passing instrument of claim 1 wherein the tubular shaft distal portion extends along a complex curve, the coupling member also extending along the complex curve.

8. The suture passing instrument of claim 1 wherein the coupling member is further coupled to the handle by a biasing member, configured to maintain a minimum tension on the coupling member.

9. The suture passing instrument of claim 1 wherein the tubular shaft distal portion is angularly offset from a proximal portion of the tubular shaft, the angular offset is at least 90 degrees.

10. The suture passing instrument of claim 9 wherein a coupling member distal-most end is disposed along the shaft distal portion that is angular offset.

11. The suture passing instrument of claim 1 wherein the coupling member defines a distal-most end that slidingly wraps around a transverse rod, the transverse rod fixedly coupled to the tubular shaft and axially spaced from the opening.

12. A suture passing instrument comprising:
    a handle at a proximal end of the suture passing instrument, the handle having an actuator;
    a tubular shaft extending from the handle, the tubular shaft defining a longitudinal axis and including a distal portion with an opening;
    a hook movable along the tubular shaft longitudinal axis from a retracted configuration in which the hook is situated within the tubular shaft, and a deployed configuration in which the hook extends through the opening and external to the tubular shaft; and
    a coupling member defining a flexible loop disposed within the tubular shaft, directly coupled to the hook and operably coupled to the actuator, the coupling member configured to move the hook to the deployed configuration by moving the coupling member in a proximal direction and also retract the hook to the retracted configuration by moving the coupling member distally.

13. The suture passing instrument of claim 12 wherein the shaft distal portion defines a sharp distal tip.

14. The suture passing instrument of claim 12 wherein the flexible loop is entirely disposed within the tubular shaft and has a distal-most end that has a fixed location.

15. The suture passing instrument of claim 12 wherein the flexible loop slidingly wraps around a rod, the rod extending across the tubular shaft distal portion.

16. The suture passing instrument of claim 12 wherein tension in a proximal direction on a first side of the flexible loop deploys the hook and tension in the proximal direction on a second side of the flexible loop retracts the hook.

17. The suture passing instrument of claim 12 wherein the tubular shaft distal portion defines a complex curve, the flexible loop extending along the complex curve.

* * * * *